United States Patent Office 3,462,278
Patented Aug. 19, 1969

3,462,278
METHOD OF COOKING FOWL
John H. Mahon, Scott Township, Allegheny County, Pa., assignor to Calgon Corporation, a corporation of Delaware.
No Drawing. Continuation-in-part of application Ser. No. 490,643, Sept. 27, 1965. This application Aug. 5, 1968, Ser. No. 749,989
Int. Cl. A22c 21/00
U.S. Cl. 99—107                3 Claims

ABSTRACT OF THE DISCLOSURE

A method of cooking fowl (poultry which is more than ten months of age) is provided to obtain reduced cooking time and greater de-boned yields by cooking said fowl in a heated solution of about 0.5% or more of a non-cyclic phosphate of an alkali metal phosphate.

---

This application is a continuation in part of my co-pending application Ser. No. 490,643 filed Sept. 27, 1965, now abandoned.

This invention relates to poultry processing and particularly to the cooking of poultry. In the cooking of old poultry, generally classified commercially as "fowl" (old chickens, etc.), the cooking time is usually long, and the boning and recovery of flesh during the boning operation is tedious and difficult because of the strong adherence of the flesh to the bone. Ordinary cooking time for old poultry or commercial "fowl" is typically two hours and thirty minutes in boiling water and meat yields on de-boning are 35% to 40%. In addition, old poultry tends to rapidly lose its "fresh" taste by reason of oxidation. Many attempts have been made to reduce the cooking time, such as by pressure cooking, but with resulting loss of flavor. As a result, the standard for cooking excellency has remained the low, smooth boil and the cooking time at about two and one-half hours.

In order to better understand the nature and significance of this invention it is necessary to define the several commercial classifications of poultry. Generally poultry is classified as follows:

| | |
|---|---|
| Immature birds | 5–7 weeks of age. |
| Broilers and fryers | 9–12 weeks of age. |
| Roasters | 3–5 months of age. |
| Fowl | More than 10 mos. of age (breastbone inflexible). |

Poultry, other than fowl, may be cooked quite rapidly to produce tender, succulent product of good taste. For example, a fryer may be cooked in water at a low boil in about a half an hour. An old fowl, on the other hand, without the treatment of this invention cannot be cooked to a satisfactory product in the same bath in less than about two and one half hours. This apparently is the result of marked toughness of the flesh and connective tissue in the old poultry.

The practice of the present invention reduces the cooking time for fowl to one hour and thirty minutes without loss of flavor but, on the contrary, an improvement in flavor. In addition, there results a marked increase in de-boned yields and a marked improvement in oxidative stability. The reasons for the improved de-boned yields and reduced cook time are not understood. There is a very significant loosening of the cooked flesh from the bone in the practice of the present invention, making the meat more easily separated from the bone.

In the practice of the present invention, fowl are cooked in a solution of water containing from about 0.5% up to about 4% of a noncyclic polyphosphate of an alkali metal selected from the group sodium and potassium and having a ratio of alkali metal oxide to phosphorous pentoxide of about 0.9 to 1 to about 2.0 to 1. It is preferred to use fully substituted salts of polyphosphoric acid or where partially substituted salts, such as sodium acid pyrophosphate ($Na_2H_2P_2O_7$) are used that they be used in the presence of a fully substituted salt of polyphosphoric acid. Among the compositions which may be used in the practice of the present invention including one or more partially substituted alkali metal polyphosphates are (a) mixtures of $M_4P_2O_7$ and $M_2H_2P_2O_7$ in ratios of from 1 to 0 to about 1 to 2 by weight; (b) $M_3HP_2O_7$ and (c) mixtures of $M_2H_2P_2O_7$ and $M_3HP_2O_7$ in ratios of from 0 to 1 to about 1 to 2 by weight where M is one of the alkali metals sodium and potassium. The preferred polyphosphate for use in the practice of this invention is sodium tripolyphosphate ($Na_5P_3O_{10}$). Other molecularly dehydrated phosphates which are similarly useful are sodium hexametaphosphate ($NaPO_3$), tetrasodium pyrophosphate ($Na_4P_2O_7$), tetrapotassium pyrophosphate ($K_4P_2O_7$) and potassium tripolyphosphate ($K_5P_3O_{10}$).

The invention is particularly advantageous in the preparation of old poultry generally termed "fowl" in the trade, because of the marked reduction in cooking time which may be achieved and the resultant commercial advantage.

Preferably the amount of polyphosphate included in the cooking solution should lie in the range 0.5% to 4%, although larger amounts may be used without deleteriously affecting the "fowl" but without any added improvement in processing. Generally, amounts between 0.5% to 1.5% should be used where the broth from the cook is to be used. Larger amounts than 1.5% tend to give the broth an excessively "soapy" taste. Preferably the cooking temperature is above 75° C. and the cook solution is free of sodium chloride above that added to impart flavor.

The use of phosphates in connection with the processing of meat and fat to produce some desired results is not in itself new. Hall Patent 2,513,094 discloses the use of certain phosphates in cured meat to inhibit the greening which occurs in such meats as a result of oxidation on standing. Watts, Patent 2,629,644 discloses the addition of phosphates to aqueous fatty compositions to stabilize them against oxidative deterioration (rancidity). Delaney Patent 3,188,213 discloses a method of tenderizing fresh meat such as beef "by subjecting the same to contact with an aqueous solution containing a major proportion of sodium chloride and minor proportions of non-linear phosphates, * * * and, in addition, a proteolytic enzyme." Delaney dips the meat in such solution for about 45 seconds. Mahon Patent 3,104,170 describes a method of treating raw poultry to prevent organoleptic deterioration by introducing into the poultry flesh a phosphate in an amount in excess of 0.1%. Nothing in any of this prior art, teaches or even suggests that old poultry can be cooked in a solution of polyphosphate as here described and claimed so as to reduce the cooking time and thereby markedly increase the production to be achieved in any set of cooking vessels.

This invention can perhaps be best understood by reference to the following examples illustrative of the process.

EXAMPLE I

Two hundred pounds of frozen fowl were thawed overnight in 64° F. water. One hundred pounds of the thawed fowl were cooked for 2 hours and 30 minutes in 140 pounds of water. The other hundred pounds of fowl were cooked for 1 hour and 35 minutes in 140 pounds of ½% sodium tripolyphosphate solution. Both the sodium tripolyphosphate and water solutions were kept at a low smooth boil.

After the fowl were cooked, they were cooled for 20 minutes in 64° F. water. They were drained, weighed and de-boned manually. The meat, skin and bone weights were obtained and samples of the meat were frozen for later analyiss.

The same procedure was followed for fowl cooked in 1% and 2% sodium tripolyphosphate solution. The controls for these two tests were cooked for 2 hours and 30 minutes. The test batches were cooked for 1 hour and 30 minutes and 1 hour and 45 minutes respectively.

Subjective evaluation by experienced plant personnel indicated that the fowl cooked in sodium tripolyphosphate solution were adequately cooked at 1 hour and 30 minutes and slightly overcooked at 1 hour and 45 minutes.

TABLE 1

| Treatment | Cook time | Percent meat yield | Percent moisture | Percent $Na_5P_3O_{10}$ in fowl |
|---|---|---|---|---|
| Water cook | 2'30'' | 35.2 | 65.5 | |
| ½% $Na_5P_3O_{10}$ cook | 1'35'' | 37.4 | 64.9 | 0.02 |
| Water cook | 2'30'' | 34.5 | 64.8 | |
| 2% $Na_5P_3O_{10}$ cook | 1'45'' | 37.5 | 66.8 | 0.32 |

EXAMPLE II

Two hundred pounds of frozen fowl were thawed overnight in 64° F. water. Three fifty-three pound samples of thawed aged fowl were cooked successively in 76 pounds of gently boiling water. Each sample was cooked for 2½ hours.

Three fifty-three pound samples of thawed fowl were cooked successively in gently boiling 1½% $Na_5P_3O_{10}$ solution. Each sample was cooked for 1½ hours.

After the fowl were cooked, they were cooled for 20 minutes in 64° F. water. They were drained, weighed and manually de-boned. The meat, skin and bone weights were obtained and samples of the meat were frozen for later analysis.

The same procedure was followed for fowl cooked in 2% $Na_5P_3O_{10}$ solution. The controls were cooked for 2½ hours in water. The test samples were cooked for 1½ hours. All of the fowl cooked in $Na_5P_3O_{10}$ solution for 1½ hours were judged to be thoroughly cooked.

TABLE 2

| Treatment | Cook time | Percent Meat yield | Percent moisture | Percent $Na_5P_3O_{10}$ in fowl |
|---|---|---|---|---|
| 1st water cook | 2'30'' | 35.8 | 66.0 | |
| 2nd water cook | 2'30'' | 35.8 | 66.8 | |
| 3rd water cook | 2'30'' | 35.7 | 66.0 | |
| 1st cook in 1½% $Na_5P_3O_{10}$ solution | 1'30'' | 38.0 | 67.0 | 0.14 |
| 2nd cook in 1½% $Na_5P_3O_{10}$ solution | 1'30'' | 37.9 | 66.2 | 0.14 |
| 3rd cook in 1½% $Na_5P_3O_{10}$ solution | 1'30'' | 37.3 | 67.0 | 0.14 |
| 1st cook in 2% $Na_5P_3O_{10}$ solution | 1'30'' | 39.6 | 68.0 | 0.16 |
| 2nd cook in 2% $Na_5P_3O_{10}$ solution | 1'30'' | 38.8 | 67.5 | 0.14 |
| 3rd cook in 2% $Na_5P_3O_{10}$ solution | 1'30'' | 39.0 | 66.0 | 0.14 |

EXAMPLE III

Twenty-eight chilled fowl were halved. The halves were paired for control purposes. Four samples, three halves per sample, were cooked 1½ hours each in the same gently boiling 1½% $Na_5P_3O_{10}$ solution. Four samples, three halves per sample, were cooked 2½ hours each in the same water broth. The cooked half carcasses were cooled in water for 5 minutes, drained, weighed and manually de-boned. The meat, skin and bone weights were obtained and samples were frozen for later analysis. The fowl cooked for 1 hour and 30 minutes in the $Na_5P_3O_{10}$ solution, were judged to be thoroughly cooked.

TABLE 3

| Treatment | Cook time | Percent Meat yield | Percent moisture | Percent Added $Na_5P_3O_{10}$ |
|---|---|---|---|---|
| 1st cook in 1½% $Na_5P_3O_{10}$ solution | 1'30'' | 43.1 | 65.5 | 0.18 |
| 2nd cook in 1½% $Na_5P_3O_{10}$ solution | 1'30'' | 45.2 | 64.2 | 0.28 |
| 3rd cook in 1½% $Na_5P_3O_{10}$ solution | 1'30'' | 42.7 | 63.2 | 0.38 |
| 4th cook in 1½% $Na_5P_3O_{10}$ solution | 1'30'' | 41.3 | 63.2 | 0.21 |
| 1st water cook | 2'30'' | 40.5 | 63.5 | |
| 2nd water cook | 2'30'' | 41.6 | 63.5 | |
| 3rd water cook | 2'30'' | 40.5 | 63.2 | |
| 4th water cook | 2'30'' | 41.2 | 62.8 | |

EXAMPLE IV

Six commercially processed fowl were halved. The weighed halves were randomly placed in four groups of three.

One group was cooked 1 hour and 45 minutes in gently boiling 2% $Na_5P_3O_{10}$ solution, one in 4% $Na_5P_3O_{10}$ solution, one in 6% $Na_5P_3O_{10}$ solution, and one for 2 hours and 30 minutes in gently boiling water.

The cooked fowl were cooled in water, drained for 5 minutes, weighed and manually de-boned. The meat, skin and bones were weighed. Samples of the meat and skin were frozen for later analysis.

TABLE 4

| Treatment | Cook time | Percent Meat yield | Percent moisture | Percent $Na_5P_3O_{10}$ in fowl |
|---|---|---|---|---|
| 2% $Na_5P_3O_{10}$ cook | 1'45'' | 44.46 | 68.0 | 0.38 |
| 4% $Na_5P_3O_{10}$ cook | 1'45'' | 44.19 | 66.8 | 0.78 |
| 6% $Na_5P_3O_{10}$ cook | 1'45'' | 43.55 | 64.5 | 0.88 |
| Water cook | 2'30'' | 40.83 | 64.0 | |

The foregoing examples illustrate the drastic reduction in cooking time and increase in boning yields which result from the practice of this invention in fowl. The significance of these in commercial production of cooked aged fowl are obvious. In the present practice which requires a 2½ hour cook, it is possible to get no more than three cooks per 8 hour day. By the present invention it is possible to get as many as five cooks per 8 hour day, a production increase of 67⅔% from the same equipment. At the same time a boned meat yield increment of about 5% is achieved. These increases in production are of great importance to the poultry processor and solve a problem which heretofore remained unsolved.

The same effects can be obtained at lower cooking temperatures, such as 185° F.–190° F. In all cases marked reductions in TBA values are attained. The following examples are illustrative.

EXAMPLE VI

Fowl cooked in 185° F.–190° F. phosphate solution

Approximately twenty-eight pounds (ten carcasses) of frozen fowl were thawed in a tank of 65° F. tap water. The necks, wing tips and leaf fat were removed.

Five carcasses were cooked in a 185° F.–190° F., 3% solution of $Na_5P_3O_{10}$ for 3¾ hours. The remaining five carcasses were cooked in water at 185° F.–190° F. for 3¾ hours.

The cooked fowl were cooled in water for 10 minutes, drained, weighed and deboned. The meat samples were frozne for later analysis.

| Treatment | Cook time (hr.) | Cook Temperature (° F.) | Percent meat yield | Percent P₂O₅ | TBA 0 days | TBA 6 days |
|---|---|---|---|---|---|---|
| % Na₅P₃O₁₀ cook | 3¾ | 185 | 49.88 | 0.50 | 0.43 | 0.4 |
| Water cook | 3¾ | 185 | 40.06 | 0.46 | 4.70 | 7.007 |

EXAMPLE VII

Fowl cooked in boiling phosphate solution

Approximately 105 pounds (forty carcasses) of frozen fowl were thawed in a tank of 65° F. tap water. The necks, wing tips, and leaf fat were removed.

Eight sample lots of five birds per lot were cooked in the following solutions: Water, 3% $Na_2HPO_4$, 3% $Na_4P_2O_7$, 3% 2 parts $Na_4P_2O_7$/1 part $Na_2H_2P_2O_7$, 3% 1 part $Na_4P_2O_7$/2 parts $Na_2H_2P_2O_7$, 3% 1 part $Na_4P_2O_7$/1 part $Na_2H_2P_2O_7$, 3% $Na_2H_2P_2O_7$, 3% $(NaPO_3)_x$. The cooked fowl were cooled in water for 10 minutes, drained, weighed and deboned. The meat samples were frozen for later analysis.

| Medium cooking treatment | Approx. cook temperature (°F.) | Cook time | Percent P₂O₅ | TBA 0 days | TBA 4 days |
|---|---|---|---|---|---|
| Water | 212 | 2'30" | 0.33 | 4.30 | 6.00 |
| 3%, Na₂HPO₄ | 212 | 1'45" | 0.72 | 2.00 | 3.75 |
| 3%, Na₄P₂O₇ | 212 | 1'45" | 0.52 | 0.58 | 0.73 |
| 3%, 2:1, Na₄P₂O₇/Na₂H₂P₂O₇ | 212 | 1'45" | 0.70 | 0.48 | 0.55 |
| 3%, 1:2, Na₄P₂O₇/Na₂H₂P₂O₇ | 212 | 1'45" | 0.61 | 0.78 | 0.90 |
| 3%, 1:1, Na₄P₂O₇/Na₂H₂P₂O₇ | 212 | 1'43" | 0.52 | 0.68 | 0.75 |
| 3%, Na₂H₂P₂O₇ | 212 | 1'42" | 0.67 | 0.70 | 0.80 |
| 3% (NaPO₃)ₓ | 212 | 2'00" | 0.62 | 0.63 | 0.95 |

While the foregoing specification has set out certain preferred embodiments and practices of this invention, it will be understood that the invention may be otherwise embodied within the scope of the following claims.

I claim:

1. The method of cooking fowl which is more than ten months of age to obtain reduced cooking time and greater de-boned yields which comprises cooking said poultry for about one and one-half hours in a heated aqueous solution of about 0.5% or more of a non-cyclic phosphate of an alkali metal selected from the group consisting of sodium and potassium having a ratio of alkali metal oxide to $P_2O_5$ from about 0.9 to 1 to about 2 to 1.

2. The method of cooking fowl which is more than ten months of age to obtain reduced cooking time and greater de-boned yields as claimed in claim 1 wherein the phosphate is sodium tripolyphosphate.

3. The method of cooking fowl which is more than ten months of age to obtain reduced cooking time and greater de-boned yields as claimed in claim 1 wherein the phosphate is a mixture of sodium pyrophosphate and sodium tripolyphosphate.

References Cited

UNITED STATES PATENTS

| | | | |
|---|---|---|---|
| 2,198,209 | 4/1940 | Musher | 99—157 X |
| 2,629,664 | 2/1953 | Watts et al. | |
| 3,104,170 | 9/1963 | Mahon | 99—157 X |
| 3,188,213 | 6/1965 | Delaney | 99—107 |

HYMAN LORD, Primary Examiner

UNITED STATES PATENT OFFICE
CERTIFICATE OF CORRECTION

Patent No. 3,462,278                          August 19, 196

John H. Mahon

It is certified that error appears in the above identified patent and that said Letters Patent are hereby corrected as shown below:

Column 3, line 7, "analysiss" should read -- analysis --.
Column 5, in the first table, under the heading TBA, "7.007" should read -- 7.00 --.

Signed and sealed this 19th day of May 1970.

(SEAL)
Attest:

Edward M. Fletcher, Jr.                   WILLIAM E. SCHUYLER, JR.
Attesting Officer                             Commissioner of Patents